ǁ
3,521,071
ELECTRO-OPTICAL APPARATUS FOR DEVELOPING AN EFFECT REPRESENTATIVE OF THE ATTITUDE OF THE APPARATUS RELATIVE TO THAT OF A SOURCE OF RADIANT ENERGY
Jack B. Speller, New York, N.Y., assignor to Aeroflex Laboratories, Incorporated, Plainview, N.Y., a corporation of Delaware
Filed Sept. 25, 1967, Ser. No. 670,267
Int. Cl. G01b *11/27;* G01c *1/00*
U.S. Cl. 250—203                    7 Claims

ABSTRACT OF THE DISCLOSURE

In its simplest form, the disclosure comprises two spaced images of a light source formed on a continuously rotating disc, half transparent and half opaque. The two images are registered upon a photocell which develops a first periodic potential synchronous with the rotation of the disc. A second periodic potential from a separate source of constant amplitude and also synchronous with rotation of the disc is combined with the first periodic potential in a phase-sensitive demodulator, which develops an output signal representative of the deviation of the line-of-sight of the apparatus from the line of view to the light source.

---

This invention relates to electro-optical attitude-measuring apparatus and more particularly to such apparatus for developing an effect representative of the attitude of the apparatus relative to that of a source of radiant energy. More specifically, the invention is suitable for embodiment in apparatus for measurement of the deviation of the line-of-sight of the apparatus from, or for tracking, a light source such as a star, a homing searchlight, etc., or for following or for aligning the apparatus with a reference division line between areas of different luminosity, for example, the horizon or a disc on a reference shaft partially light translating and partially non-light translating.

BRIEF SUMMARY OF THE INVENTION

In accordance with the invention, there is provided an electro-optical apparatus for developing an effect representative of the attitude of the apparatus relative to that of a source of radiant energy comprising two portions of substantially different intensities on opposite sides of a dividing line, a continuously rotatable light-translating means including two continuously rotatable discs, each having two discrete semicircular areas of substantially different light-translating properties, optical means for forming on the discs individual images of the source, the angular phase relation between the image of the source and the light-translating pattern of one of the discs being opposite to such pattern of the other of the discs, and photoelectric means responsive to the sum of the two images translated by the light-translating means for developing an electrical signal of an amplitude varying with and representative of the relative attitude of the apparatus and the source of radiant energy. As used herein and in the appended claims, the term "electro-optical apparatus" means apparatus for translating any electromagnetic radiation having the propagation characteristics of visible light. The term "light translating" is used herein and in the appended claims to refer to translation by reflection or by transmission, including refraction, or a combination of the two.

BRIEF DESCRIPTION OF THE DRAWINGS

FIGS. 7*a* and 7*b* are diagrams to aid in the explanation of the operation of the apparatus of FIG. 6, while

DETAILED DESCRIPTION

For a better understanding of the present invention, together with other and further objects thereof, reference is had to the following description, taken in connection with the accompanying drawings, while its scope will be pointed out in the appended claims.

Figure 1:
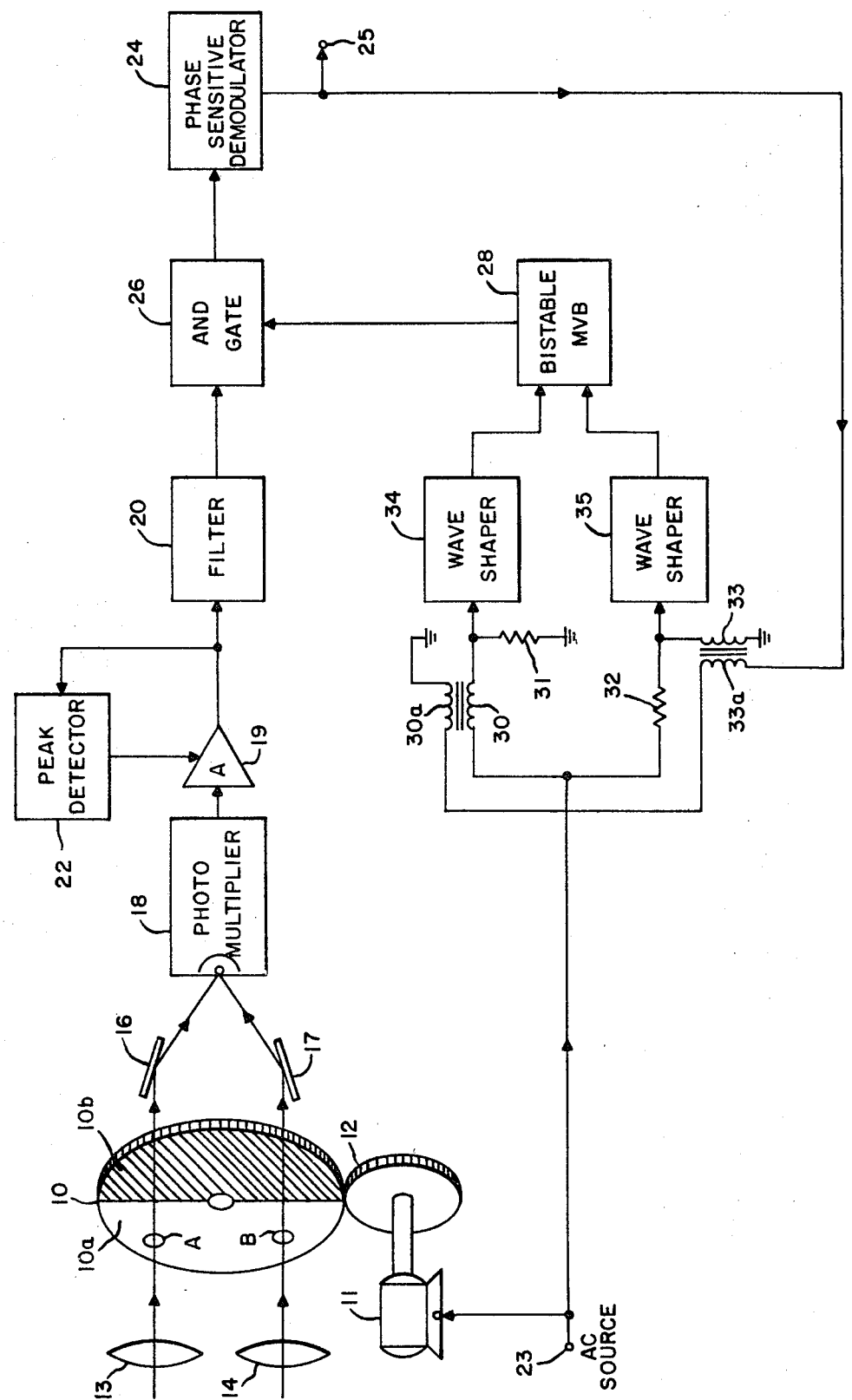
FIG. 1 is a schematic diagram of an electro-optical attitude-measuring apparatus embodying the invention suitable for measuring the deviation of the line-of-sight of the apparatus from a light source, such as a star.

Referring now to FIG. 1 of the drawings, there is shown an electro-optical apparatus for developing an effect representative of the attitude of the apparatus relative to that of a source of radiant energy, specifically, representative of the angular deviation of the optical axis of the apparatus from the line-of-sight to a source of radiant energy in a given plane. This apparatus includes a continuously rotatable light-translating means having at least two discrete areas substantially symmetrically disposed on opposite sides of the axis of rotation, for example a rotatable disc 10 having two semicircular portions 10*a*, 10*b* having substantially different light-translating properties. Specifically, the area 10*a* is indicated as being transparent and the area 10*b* as opaque. The disc 10 is toothed and is adapted to be driven from a continuously operating motor 11 through a pinion 12.

The apparatus of FIG. 1 further comprises optical means for forming at least two spaced images of a radiant energy source on the light-translating disc 10. Assuming that the light source is a star at infinite distance, the two spaced images, indicated at A and B on the disc 10, may be formed by spaced lenses 13 and 14, respectively, receiving light from the star in effectively parallel beams.

The apparatus of FIG. 1 further comprises photoelectric means responsive to the sum of the two images translated by the light-translating disc 10 for developing an electrical signal of an amplitude varying with, and representative of, the relative attitude of the apparatus and the source of radiant energy. Specifically, the images A, B transmitted through the disc 10 are deflected by mirrors 16, 17, respectively, in super-posed relation on the cathode of a photomultiplier 18 which may be of conventional design. The disc 10 is preferably rotated at a relatively high speed so that the signal developed by the photomultiplier 18 is a relatively high-frequency signal modulated by the attitude-representative information, as described hereinafter. The output of the photomultiplier 18 is passed through an amplifier 19 and a filter 20, passing a narrow band of frequencies around the nominal frequency to minimize spurious signals of other frequencies. In order to minimize variations in the response of the apparatus to stars or other light sources of different magnitude, the portions 10a, 10b of disc 10 may be slightly unsymmetrical, thus generating a second harmonic component of signal which is present even when the apparatus is in accurate alignment with the radiant energy source. This second harmonic frequency component is applied from the output or amplifier 19 to a peak detecor 22 which develops a unidirectional bias which is applied back to the amplifier 19 to maintain the level of the signal output of the amplifier 19 within a narrow range for a wide range of radiant energy sources.

The apparatus of FIG. 1 further includes means for generating a constant-amplitude periodic signal of the same frequency as that developed by the photomultiplier 18. This means may be either an AC source 23 utilized to drive the motor 11 which, in this instance, is a synchronous motor, or this signal may be derived from a tachometer generator driven by the motor 11. The apparatus further includes a phase-sensitive demodualtor 24 responsive to the periodic signal developed by photomultiplier 18 and that from the source 23 for developing the desired attitude-representative signal which appears at the output terminal 25.

In order to increase the signal-to-noise ratio of the system, a gating circuit is inserted between the filter 20 and the phase demodulator 24 which is controlled by the output signal, automatically to limit the portion of each cycle during which the signal from the filter 20 is applied to the phase-sensitive demodulator 24 and, thus, reduce the poriton of each cycle during which spurious noise may be translated through the apparatus. To this end, the output signal of filter 20 is passed through an AND gate 26, the output of which is applied to the demodulator 24. The periodic potential from the input terminal 23 is applied to a bistable multivibrator 28 through lagging and leading phase-shifting circuits. The lagging circuit to the first input circuit of multivibrator 28 comprises a series saturable reactor 30 and a shunt resistor 31, the impedance of the reactor 30 normally being substantially higher than that of the resistor 31 at the operating frequency so that the current through resistor 31 and the potential across it substantially lag that at the input terminal 23. The leading circuit to the second input circuit of multivibrator 28 comprises a series resistor 32 and a shunt saturable reactor 33, the impedance of the resistor 32 being substantially greater than that of the reactor 33 at the operating frequency so that the current through the reactor 33 is nearly in-phase wih the potential at the input terminal 23 and the voltage across the reactor 33 appreciably leads that at the terminal 23. The signals from the two phase-shifting circuits described are preferably passed through wave shapers 34, 35, respectively, to convert the sinusoidal signal from input terminal 23 to a square wave form.

The unidirectional output of the phase-sensitive demodulator 24 is applied to saturating windings 33a and 30a of reactors 33 and 30, respectively. As is well understood, saturation of a reactor decreases its reactance at any given frequency so that, as current through the windings 33a, 30a is increased, the lag angle of the potential across resistor 31 decreases and the lead angle across reactor 33 also decreases. The potentials across the resistor 31 and the reactor 33 are individually applied to the input circuits of multivibrator 28. The multivibrator, in a conventional manner, develops a rectangular pulse output wave, the leading edge of each pulse being determined by the voltage across reactor 33 and the trailing edge being determined by the potential across resistor 31. Therefore, the output of the multivibrator 28 is a rectangular pulse wave of a duration depending upon the magnitude of the output signal of the demodulator 24.

Figure 2A:
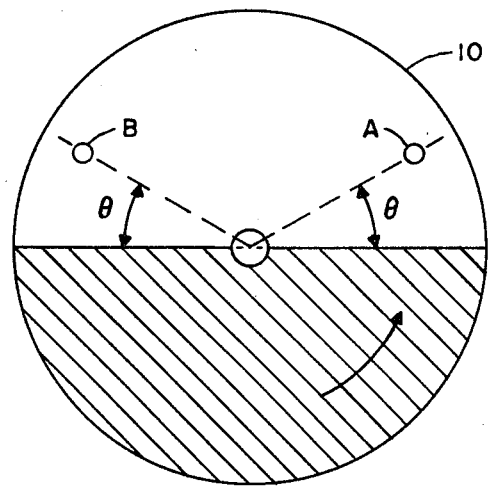
FIGS. 2*a*–2*d* are diagrams to aid in explaining the operation of the apparatus of FIG. 1.
Figure 2B:
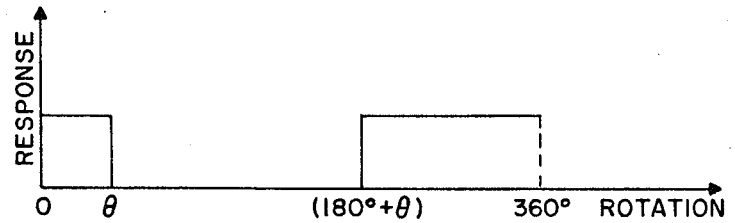
Figure 2C:
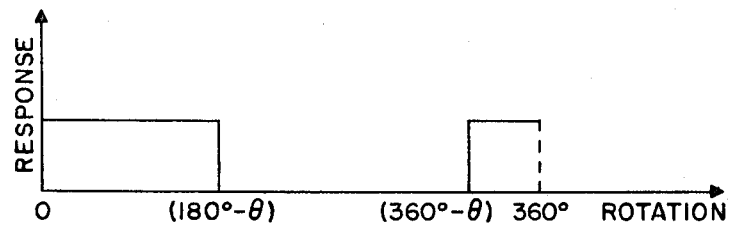

The operation of the apparatus of FIG. 1 may be explained by reference to FIGS. 2a–2d in which the images A and B of the star on the disc 10 corresponds to those of FIG. 1. The signal developed by the photomultiplier 18 from the image B, as the disc 10 is rotated in a counterclockwise direction as indicated, is represented in FIG. 2b. Briefly, this signal has a constant amplitude while the disc is rotating through angle θ, zero amplitude while it is rotating through the angle θ to (180+θ) and, again, maximum amplitude until it completes rotation of 360°. The response of the system to the image A is represented in FIG. 2c in a similar manner. Since the two images are superposed on the photomultiplier 18, the resulting electrical signal developed thereby is the summation of the responses indicated in FIGS. 2b and 2c as represented in FIG. 2d.

Figure 2D:
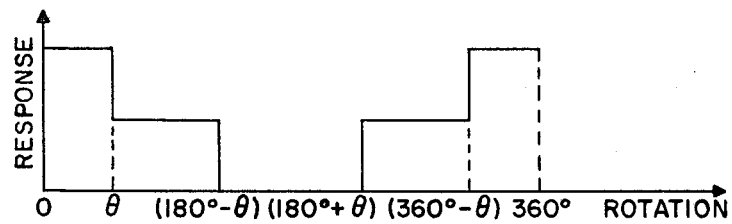

While the electro-optical apparatus of FIG. 1, as described, thus develops an output signal represented by the wave form of FIG. 2d, for the purpose of analysis the relationships can be simplified by assuming that each of the images A, B develops a sine wave output of a period equal to the period of the pulse waves of FIGS. 2b and 2c. With this simplifying assumption, the signal developed by the image A may be represented by the expression:

$$K \sin (\omega t - \theta) \qquad (1)$$

Image B produces a signal output represented by the expression:

$$K \sin(\omega t - 180° + \theta) \qquad (2)$$

The resultant signal is the sum of Equations 1 and 2 or $$-2K \sin \theta \cos \omega t \qquad (3)$$

For small angles or θ, sin θ is approximately equal to θ so that Equation 3 becomes $$-2K \theta \cos \omega t \qquad (4)$$

In other words, the amplitude of the high-frequency signal output of photomultiplier 18 is proportional to the phase angle θ between the two signals developed by the images A and B. The sign of θ determines the polarity of the carrier signal. Thus, the accuracy and stability of the phase detection is principally determined by the stability of the geometry of the configuration and not by the stability of the various electrical components. At the same time, due to the action of the gating circuit comprising the elements 26, 28 and 30–35, the input signal to the demodulator 24 is limited to that fraction of the cycle of rotation of the disc 10 during which a useful signal is developed, thus imparting substantial noise immunity to the system.

The apparatus of FIG. 1 is described as measuring the angular deviation of the optical axis of the apparatus from the line-of-sight to a star in one plane, for example the vertical plane. Usually, it will be desirable to duplicate the apparatus of FIG. 1 to measure the corresponding deviation in an orthogonal plane, in which case, lenses such as the lenses 13, 14 will be spaced in such orthogonal plane.

Figure 3:
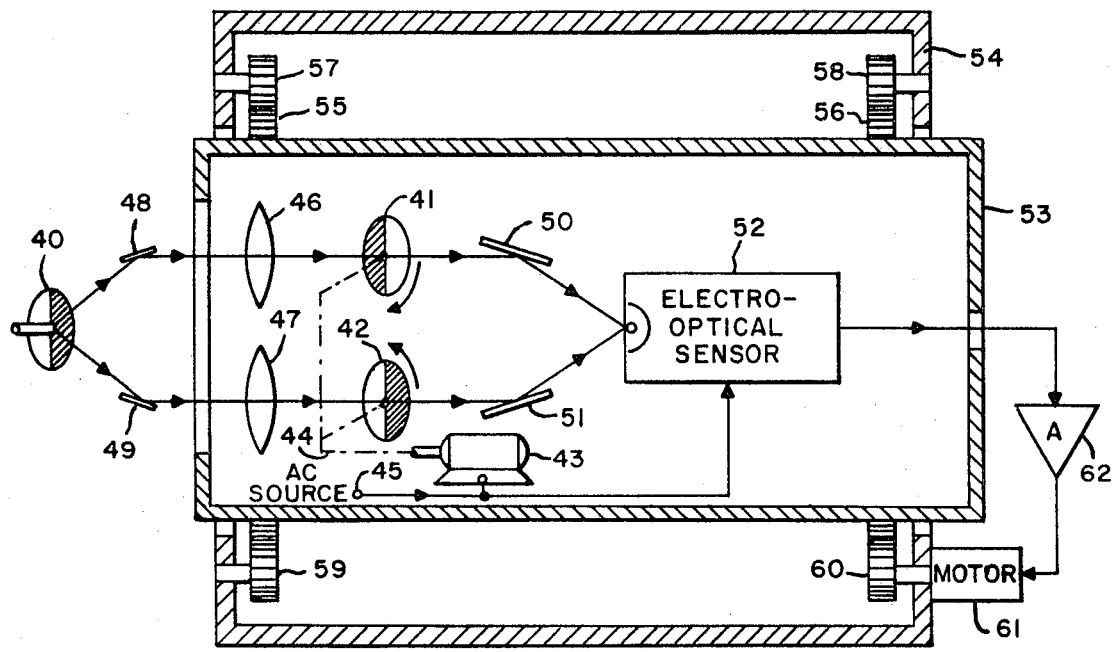
FIG. 3 is a schematic diagram of an electro-optical attitude-measuring apparatus for aligning the apparatus with a reference division line between areas of different luminosity, such as a disc on a reference shaft half light translating and half nonlight translating.

Referring now to FIG. 3, there is represented a modification of the apparatus of FIG. 1 in which the source of radiant energy comprises two portions of substantially different luminosities on opposite sides of a dividing line, specifically a rotatable disc 40 substantially one-half being light translating, for example reflecting, and the other half being nonlight translating, for example light absorbing. In the apparatus of FIG. 3, the light-translating means comprises two discs 41 and 42 continuously rotatable in opposite directions, as indicated, being driven by a continuously operating motor 43 through mechanism indicated schematically at 44, the motor 43 being energized from an AC source represented by input terminal 45.

Each of the discs 41, 42 of FIG. 3 has two discrete semicircular areas of substantially different light-translating properties, for example one-half transparent and one-half opaque. The apparatus includes optical means such as the lenses 46 and 47 and deflecting mirrors 48 and 49 for forming on the discs 41 and 42, respectively, individual images of the source disc 40. As indicated in FIG. 3, the transparent and opaque portions of the discs 41 and 42 are opposite in phase so that the angular phase relation between the image of the source and the light-transmitting pattern of one of the discs is opposite to such pattern of the other of the discs.

The images translated through the discs 41, 42 are deflected by mirrors 50 and 51, respectively, so that they are superposed upon a photocell of an electro-optical sensor 52 which may, for example, comprise the units 18–33 of FIG. 1, so that the signal output of the sensor 52 is representative of the attitude of the apparatus with respect to the source disc 40.

The source disc 40 may be mounted on a reference shaft and the apparatus made to adjust its attitude in response to the electrical signal developed by the sensor 52, thereby to reduce deviation between the attitudes of the source disc 40 and the apparatus. To this end, the elements 41–52 are mounted in a housing 53 rotatable within a frame 54. For example, the housing 53 may include a pair of ring gears 55, 56 engaging idler gears 57, 58, and 59 mounted in the frame 54. The housing 53 is adapted to be rotated by means of a gear 60 driven by a servomotor 61 energized by the output signal of the sensor 52 by way of an amplifier 62.

Figure 4:
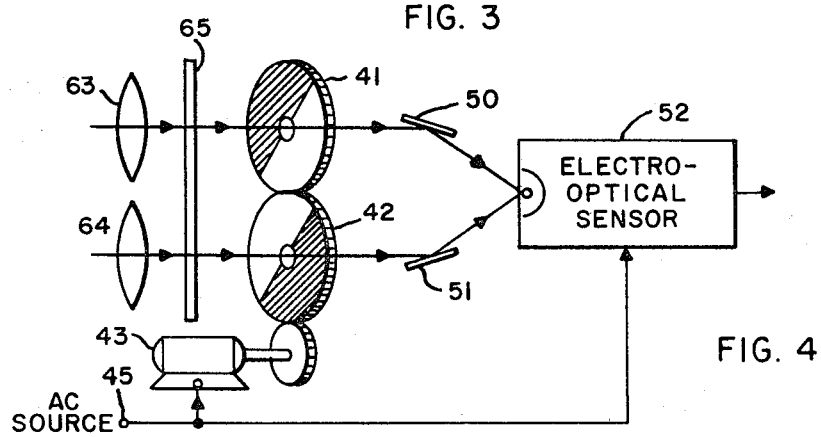
FIG. 4 is a modified form of the light-translating portion of the apparatus of FIG. 3 suitable for aligning the apparatus with the horizon.

A modification of the apparatus of FIG. 3 to respond to the horizon of an outdoor scene is shown in FIG. 4, elements corresponding to those of FIG. 3 being identified by the same reference numerals. Since the horizon is essentially at an infinite distance, the parallel rays for forming images on the discs 41 and 42 may be translated by spaced objective means 63 and 64. If desired, a ground glass or other diffusing screen 65 may be interposed between the lenses 63, 64 and the discs 41, 42, respectively.

Figure 5A:
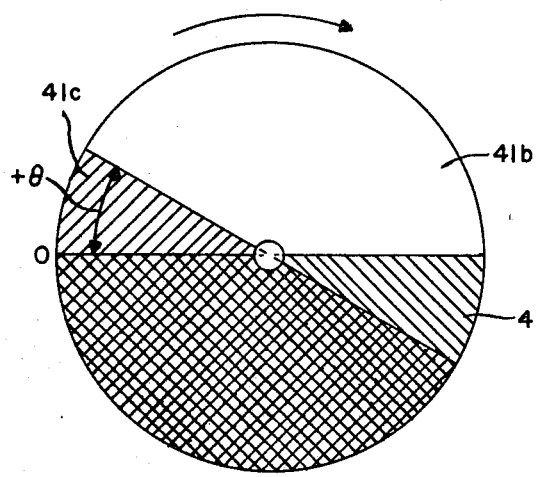
FIGS. 5*a* and 5*b* are diagrams to aid in the explanation of the operation of the apparatus of FIGS. 3 and 4.
Figure 5B:
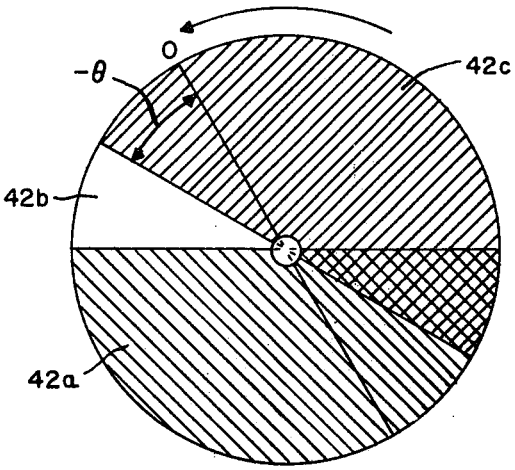

The operation of the apparatus of FIGS. 3 and 4 may be explained by reference to FIGS. 5a and 5b. In FIG. 5a, the portion 41a may represent the nonluminous portion of the light source, for example the nontranslating portion of the disc 40 of FIG. 3 or the portion of the scene below the horizon, while the portion 41b will represent the luminous portion of the light source. The semicircular portion 41c represents the opaque portion of the disc 41, of which the dividing line makes an angle $\theta$ to the dividing line of the light source. Under these conditions, only the unshaded portion of area 41b will transmit light to the sensor 52. Similarly, in FIG. 5b, the portion 42a represents the nonluminous portion of the light source, the portion 42b represents the luminous portion of the source, while the portion 42c represents the opaque portion of the disc 42. It is seen that light will be translated through only a small sector of the disc 42.

The response of the electro-optical sensor 52 of FIGS. 3 and 4 may be analyzed as follows. The amount of light through disc 41 may be represented as:

$$A \sin(\omega t + \theta) \quad (5)$$

while that through disc 42 may be represented as:

$$A \sin(\omega t - \theta + 180°) \quad (6)$$

The total light reaching sensor 52 is then:

$$2A \sin\theta \cos\omega t \quad (7)$$

The resultant represented by Equation 7 is thus applied to the electro-optical sensor 52 which develops an output signal of a polarity and magnitude representative of the relative orientation of the apparatus with respect to the horizon and this signal, amplified in the amplifier 62, is utilized to drive the servomotor 61 to align the apparatus with the horizon.

Figure 6:
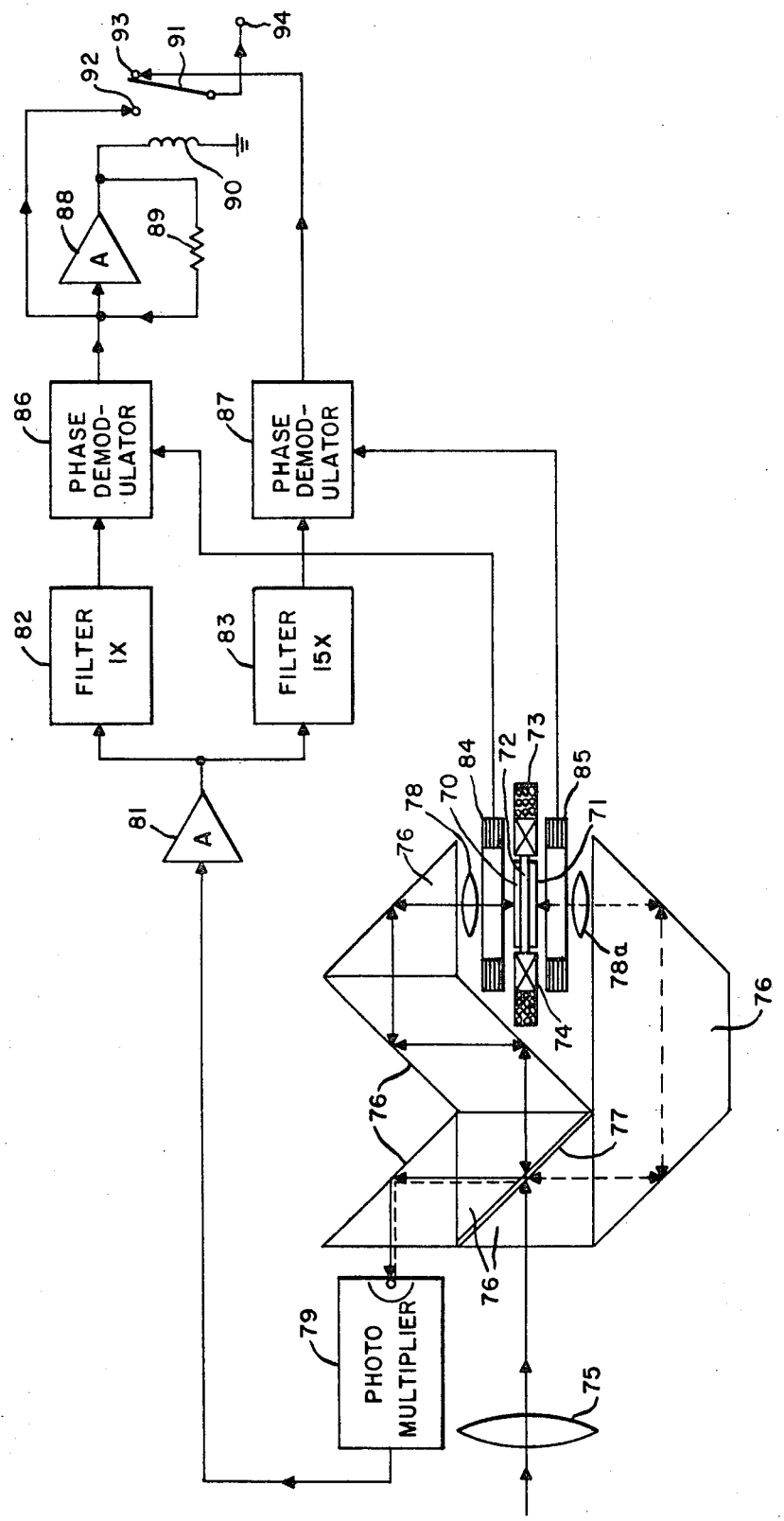
FIG. 6 is a schematic diagram of a modification of the apparatus of FIG. 1 suitable for controlling a two-speed servo-mechanism.
Figure 7A:
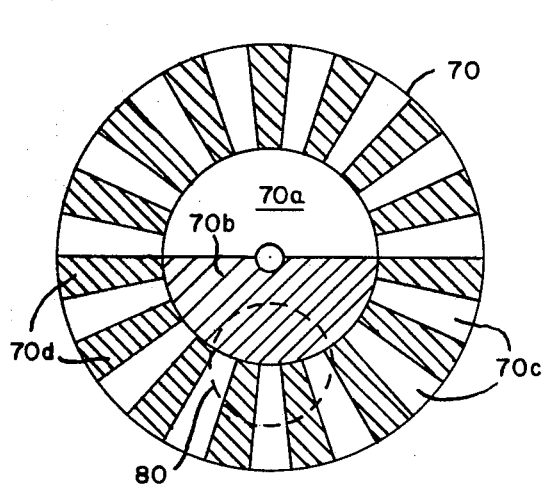
Figure 7B:
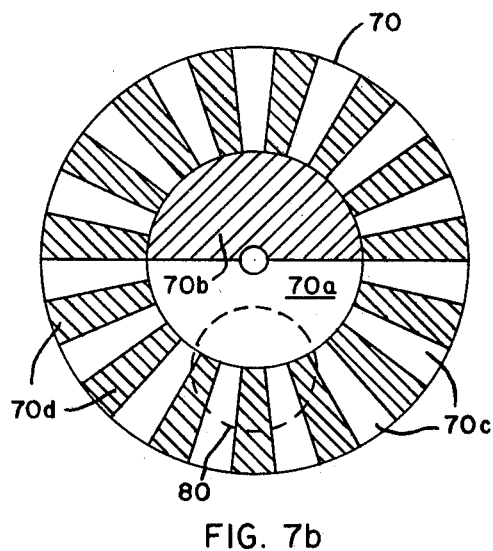

Referring now to FIG. 6, there is represented an electro-optical attitude-measuring apparatus in which the light-translating means comprises two continuously rotating discs each having a pattern of discrete areas in the form of two concentric annular areas each divided into a plurality of discrete areas of alternately different light-translating properties, the discrete areas being symmetrically disposed on opposite sides of the axis of rotation and one of the annular areas having a number of discrete areas substantially greater than that of the other annular area. The patterns on the two discs have an angular displacement of 180° relative to each other. One light-translating derive having two such annular areas is shown in FIG. 7a and a complementary device is shown in FIG. 7b. Referring to FIG. 7a, a disc 70 has a central annular portion comprising a semicircular area 70a which is light translating and a semicircular area 70b which is nonlight translating, for example, 70a may be reflective and area 70b light absorptive. These central areas may be considered annular with a zero inner radius as a limit. Surrounding the areas 70a, 70b is an annular area comprising alternate light-translating sectors 70c and light-absorptive sectors 70d, there being fifteen light and fifteen dark areas symmetrically but complementarily disposed about the horizontal axis of the disc, as seen in the figure. The disc of FIG. 7b is identical to that of FIG. 7a but inverted vertically.

The light-translating means for translating images of a source to the discs 70 and 71 is shown in FIG. 6 in which the discs 70 and 71 are mounted for rotation on the armature 72 of a hollow rotor motor comprising a stator 73 and a bearing 74. The motor 72, 73, 74 is shown schematically since it may be of a conventional type and forms no part of the present invention. An objective lens 75 images light from the source on a system of prisms 76, two of which are provided with a semitransparent interface 77. The arrangement is such that one image is translated via transmission through the interface 77, as indicated by the solid-line rays, to the upper face of the disc 70 via a lens 78, the image retracting its path to the interface 77 and being reflected thereby to a photomultiplier 79. Another image of the source is reflected from the interface 77 and proceeds, as indicated in the dotted-line rays, to the lower face of disc 71 via a lens 78a and retraces its path, being transmitted through the interface 77 also to the photomultiplier 79. The optical system is so designed that the images from the source, as formed on the light-translating discs 70, 71, overlap the concentric annular areas, as represented by the dotted-line pattern 80 in FIGS. 7a and 7b. The photomultiplier 79 thus develops a composite signal including four components, namely, high-frequency and low-frequency components from each of the discs 70, 71.

The apparatus of FIG. 6 includes means for separating the responses of the photomultipler 79 to the images on the annular areas to develop low-frequency and high-frequency signals. To this end, the output of the photomultiplier 79 is passed through an amplifier 81, two filters 82 and 83 passing a narrow band of signals about the frequencies 1X and 15X, where 1X corresponds to the synchronous speed of rotation of the discs 70 and 71 and, thus, passing the signal developed by the inner annular portion of each of the discs 70, 71, while the filter 83 is designed to pass a narrow band about the frequency 15X. The apparatus of FIG. 6 also includes means for generating two constant-amplitude signals of the same frequencies as the low-frequency and high-frequency signals. Specifically, there are provided a pair of tachometer generators 84 and 85, driven by the motor 72, 73, developing reference periodic signals of frequencies 1X and 15X, respectively. The two 1X signals are applied to a phase demodulator 86 while the two 15X signals are applied to a phase demodulator 87, each of which develops an output representative of the attitude of the apparatus with respect to the source of light. If desired, the noise-immunity circuits mebodied in the apparatus of FIG. 1 may also be included in the apparatus of FIG. 6. The low-frequency demodulated signal from the unit 86 is passed through an operational amplifier 88 having a feed-back resistor 89 and, thence, to a relay 90 having an armature 91 movable between normally open contact 92 and normally closed contact 93, the armature 91 being connected to an output terminal 94.

In the operation of the apparatus of FIG. 6, it is seen that the low-frequency and high-frequency patterns on the discs 70 and 71, displaced angularly 180° relative to each other, project phase-displaced images of both low-frequency and high-frequency components on the photomultiplier 79. These components are separated in the filters 82, 83 and detected in the phase demodulators 86, 87, to which are also applied the constant-amplitude signals of the same low and high frequencies from the generators 84, 85, respectively. If the attitude-representative signal output of the low-frequency demodulator 86 is above a predetermined amplitude, it will energize the relay 90 to close the contacts 91, 92 so that the low-frequency output is delivered to the output terminal 94. When the attitude of the apparatus closely approaches the proper orientation to the light source, either manually or by servomechanisms such as illustrated in FIG. 3, the low-frequency signal output falls to a low value. At this point, the relay 90 will drop out, closing its contacts 91, 93 to deliver the high-frequency attitude-representative signal to the output terminal 94, this high-frequency signal being much more sensitive to small deviations in the attitude of the apparatus from the orientation with the light source.

Figure 8:
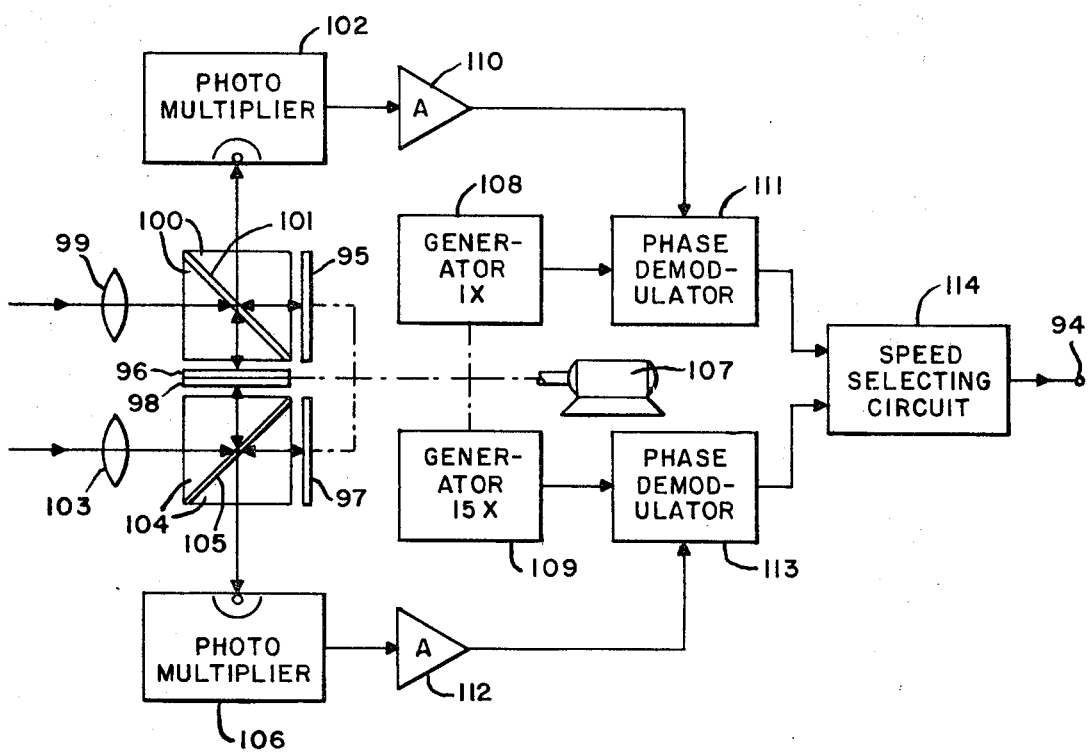
FIG. 8 is a schematic diagram of a modified form of the invention embodied in FIG. 6, utilizing separate light-translating paths for the low-speed and high-speed channels.

Referring to FIG. 8, there is shown a modification of the two-speed electro-optical measuring apparatus of FIG. 6. In the apparatus of FIG. 8, the light-translating means cmoprises two pairs of continuously rotating discs 95, 96 and 97, 98. The discs of each pair individually have annular areas of the same number of discrete areas. For example, the discs 95, 96 are of the low-frequency type represented by the inner annular portions of the discs 70 and 71 of FIGS. 7a and 7b while the discs 97, 98 have a high-frequency pattern corresponding to the outer annular rings of the discs 70 and 71 of FIGS. 7a and 7b, in each instance the pattern of discrete areas of different light-translating properties of the discs of each pair being displaced 180° relative to each other.

In the apparatus of FIG. 8, there is provided an objective lens 99 for forming images of the light source on the discs 95 and 96 by way of prisms 100 having a half-silvered interface 101, the two images being translated by the optical prisms to a photomultiplier 102. Similarly, the light source is imaged by a lens 103 and a pair of prisms 104 having a half-silvered interface 105 upon the high-frequency patterns on the discs 97 and 98, the patterns of discrete areas of different light-translating properties of the two discs also being displaced by 180 mechanical degrees. The images on the discs 97, 98 are translated via the prisms 104, 105, to a photomultiplier 106.

The discs 95, 96, 97, and 98 are all driven synchronously, as by a motor 107 which also drives tachometer generator 108 developing a frequency of 1X and a generator 109 developing a frequency of 15X. The low-frequency signal from the photomultiplier 102 is passed by an amplifier 110 to a low-frequency phase demodulator 111 which also receives the 1X signal from generator 108. Similarly, the high-frequency signal from the photomultiplier 106 is passed via an amplifier 112 to a phase demodulator 113 to which is supplied the 15X signal from generator 109. The demodulators 111, 113 develop low-frequency and high-frequency attitude-representative signals, respectively, which are passed to a speed-selecting circuit 114 which may correspond to the elements 88–93 of FIG. 6.

The operation of the apparatus of FIG. 8 corresponds to that of FIG. 6, the principal difference being in the simplification of the optical system by the use of separate objective lenses and separate image discs and photomultipliers for the low-frequency and high-frequency channels. It will be understood that the two-speed arrangement of either of FIGS. 6 and 8 may be applied to the attitude-sensing apparatus of any of FIGS. 1, 3, and 4.

It will be clear from the foregoing description that the attitude-measuring apparatus of the invention has a number of advantages. For example, the sensor is coupled to the light source only through a beam of radiant energy so that the apparatus has no reaction on the source. Furthermore, the measurement provided by the attitude sensor is always unique, avoiding ambiguities present in many attitude-sensing apparatus.

While there have been described what are, at present, considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. An electro-optical apparatus for developing an effect representative of the attitude of the apparatus relative to that of a source of radiant energy comprising two portions of substantially different intensities on opposite sides of a dividing line;
   a continuously rotatable light-translating means including two continuously rotatable discs, each having two discrete semicircular areas of substantially different light-translating properties;
   optical means for forming on said discs individual images of said source, the angular phase relation between the image of said source and the light-translating pattern of one of said discs being opposite to such pattern of the other of said discs; and
   photoelectric means responsive to the sum of the two images translated by said light-translating means for developing an electrical signal of an amplitude varying with and representative of the relative attitude of the apparatus and said source.

2. An electro-optical apparatus in accordance with claim 1 in which said source of radiant energy is a rotatable disc, substantially half light translating and substantially half nonlight translating.

3. An electro-optical apparatus is accordance with claim 1 in which said source of radiant energy is an outdoor scene including the horizon.

4. An electro-optical apparatus for developing an effect representative of the attitude of the apparatus relative to that of a source of radiant energy comprising:
   a continuously rotatable light-translating means including two annular areas each divided into a plurality of discrete areas of alternately different light-translating properties, said discrete areas being symmetically disposed on opposite sides of the axis of rotation, one of said annular areas having a number of discrete areas substantially greater than that of the other annular area;
   optical means for illuminating both of said annular areas to form at least two spaced images of said source on said means;
   photoelectric means responsive to the images translated by said light-translating means and including means for separating the responses of said photoelectric means to the images on said annular areas to develop low-frequency and high-frequency signals; and
   means responsive to the low-frequency signal for transmitting the same for amplitudes above a predetermined value and for transmitting the high-frequency signal for values of said low-frequency signal below said predetermined value.

5. An electro-optical apparatus in accordance with claim 4 including means for generating two constant-amplitude signals of the same frequencies as said low-frequency and high-frequency signals, respectively; and a pair of phase demodulators, each responsive to said electrical signals of the same frequency for developing an attitude-representative signal.

6. An electro-optical apparatus in accordance with claim 4 in which said light-translating means comprises two continuously rotating discs each having the said pattern of discrete areas in the form of two concentric annular areas, the pattern on one of said discs having an angular displacement of 180° relative to that on the other; in which the image formed on each of the discs overlaps the concentric annular areas; and in which the images on both of said discs are translated to a single photoelectric device.

7. An electro-optical apparatus in accordance with claim 4 in which said light-translating means comprises two pairs of continuously rotating discs, the discs of each pair individually having the annular areas of the same number of discrete areas and the areas on one of the discs being displaced 180° relative to the pattern on the other discs of said pair; in which the optical means forms images on each of said discs; and in which said photoelectric means comprises two photoelectric devices, each responsive to the images on the discs of one of said pairs of discs.

References Cited

UNITED STATES PATENTS 2,820,906    1/1958    Miller _____ 250—233 X
2,941,081    6/1960    Greenlee et al. _____ 250—203

OTHER REFERENCES

Whitford et al., Photoelectric Guiding of Astronomical Telescopes.

Review of Scientific Instruments, vol. 8, March 1937, pp. 78–82.

JAMES W. LAWRENCE, Primary Examiner

E. R. LaROCHE, Assistant Examiner

U.S. Cl. X.R.

250—233; 356—141, 152